United States Patent [19]

Fayet

[11] 3,735,943

[45] May 29, 1973

[54] SPACE STATION WITH SOLAR GENERATORS

[75] Inventor: Philippe Fayet, Avon, France

[73] Assignee: Centre Nationale D'Etudes Spatiales, Paris, France

[22] Filed: Mar. 5, 1971

[21] Appl. No.: 121,500

[30] Foreign Application Priority Data

June 19, 1970 France..............................7022716

[52] U.S. Cl....................................244/1 SS, 136/89
[51] Int. Cl..............................................H01l 15/02
[58] Field of Search ......................136/89; 244/1 SS

[56] References Cited

UNITED STATES PATENTS 3,620,846  11/1971  Paine.....................................136/89
3,169,725  2/1965  Beiglund..............................244/1 SS
3,300,162  1/1967  Maynard et al. ...................244/1 SS
3,606,211  6/1969  Roersch et al.......................244/1 SS
3,510,086  5/1970  Arbeitlang et al...................244/1 SS
3,532,299  10/1970  Williamson et al................136/89 X Primary Examiner—Allen B. Curtis
Attorney—Brufsky, Staas, Breiner & Halsey

[57] ABSTRACT

A solar generator has flexible panels adapted to be deployed by means of extensible frame means. The flexible active material of each panel is so arranged and the extensible frames so operated that the deployment of the panel takes place not only in the longitudinal direction away from the base, but also in the transverse direction. The panels are adapted for use on satellites or other space vehicles.

4 Claims, 24 Drawing Figures

SPACE STATION WITH SOLAR GENERATORS

It has already been proposed to equip artificial satellites with solar generators of high power (of the order of one kilowatt or more), made up in large panels for extending outside the satellite, but stored at the start in the fuse cap so that their deployment takes place only in space. Some of these solar panels are flexible, and are folded or rolled up for storing ; they are then deployed by means of extensible fittings so that their active surface is spread out. Such systems of flexible, deployable solar panels are well known in aero-space engineering and reference may be made in this respect to various projects mentioned by Doreece D. Abbott in an article entitled "Lightweight large area solar arrays" pages 772 to 777 in the publication "4th Intersociety Energy Conversion Engineering Conference — Washington, D.C., Sept. 22–26, 1969" of the American Institute of Chemical Engineers.

These deployable solar panels have generally a rectangular shape, in which the width is limited by the storing and handling conditions. For providing the large surfaces necessary to supply the required electric power, they must, therefore, be very long and this presents certain disadvantages. They may be subject to thermal distortion caused by non-uniform heating of the fittings under solar radiation. The large dimension of the fittings makes the problems of stabilisation and orientation more difficult, and requires complicated solutions. These difficulties will become even greater in view of the anticipated replacement of solar batteries of silicon by solar batteries of cadmium sulphide which are more interesting from several points of view being unbreakable, flexible, light, easy to handle, workable in all dimensions and in the shape of integrated modules, resistant to the radiation particular to outer space, etc . . . ), but have a lower output than the silicon batteries used at present ; this lower output must obviously be compensated for by an increase in the working surface and, therefore, by larger dimensions of the solar panels. By way of example, for an identical amount of electrical energy to be produced, the surface of a solar panel for cadmium sulphide is twice that of a silicon panel and, therefore, its length must be doubled for the same width.

The invention has the object of making it possible to reduce substantially problems involved in use of solar panels of the type under review, whilst preserving their performances, avoiding thereby the difficult-ies which have been outlined above. This result is achieved by a better utilisation of the space surrounding the body of the vehicle carrying the panels.

According to the invention, the active surface of the solar panel is manufactured and the extensible frame is actuated in such a manner that the deployment of the panel does not take place only in the longitudinal direction away from the mounting base but also by spreading out in the transverse direction. The gain in the surface achieved in the lateral direction makes it possible to reduce the length of the panel.

A panel of this kind is formed prior to its deployment by parts which are folded up one on the other to present a generally rectangular element with a plurality of superimposed layers. After deployment the panel has a shape which is no longer the conventional rectangle and approaches the shape of a trapezium with a large angle of aperture.

It is another object of the invention to provide an improvement aiming at a higher degree or rigidity of the deployed panels, at a reduction of the mass away from the body of the vehicle, and at a better distribution of the solar panels relative to the vehicle.

The solar panel, which has always originally the shape of a generally rectangular element with a plurality of superimposed layers, which are folded back one upon the other with a view to the subsequent extension, is combined in accordance with the improvement with a complementary framework such as an additional extensible strut which projects from the body of the vehicle during a second phase of the deployment, in a direction perpendicular or at least largely inclined relative to the direction in which the extraction takes place, causing thereby the unfolding and the transverse spreading out of the panel. The unfolded part of the rectangular original element is transversely removed therefrom, and has the general shape of a triangle or possibly a rectangle, two sides of which radiate from the body of the vehicle and the third side of which, i.e., the side remote from the vehicle, may be free.

It will be noted that the extensible struts or the like, forming part of the supporting frame of the solar generator according to the invention and stored in the retracted position within the body of the vehicle, project in fixed radial directions on deployment so that, in view of their firm mounting on the body of the vehicle, the assembly has a high degree of rigidity. Moreover, the absence of extensible struts along the remote edges of the panels relieves the same considerably, and concentrates the mass substantially in the centre.

The following description, given by way of example and with reference to the accompanying drawings, explains the invention in greater detail. In the drawings : FIGS. 1 – 4a and 4b and FIGS. 18 and 19 illustrate the prior art of others, and FIGS. 5 – 17 illustrate the invention of co-worker Wolfgang Palz and is claimed in U.S. Pat. Ser. No. 120,976 filed Mar. 4, 1971. FIGS. 20 – 23 illustrate my modification over the prior art of others and of Palz. Specifically.

FIGS. 4a and 4b are perspective views of a satellite with known actuation of extensible solar panels ;

FIG. 5 is a comparable diagram of such a known actuation and an actuation according to the invention ;

FIGS. 6 to 10 illustrate the successive stages of the folding of a solar panel according to the invention ;

FIG. 11 is a view corresponding to FIG. 1 but relating to an embodiment of the invention during its deployment ;

Figure 1:
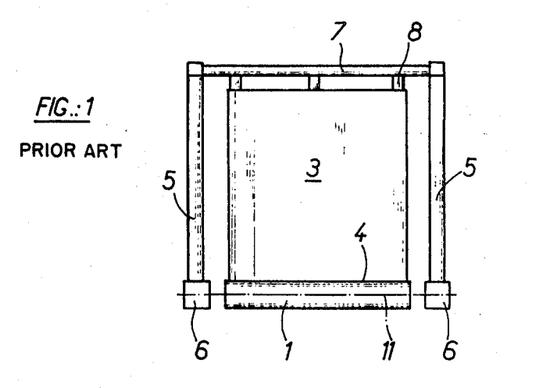
FIG. 1 is a much simplified diagrammatical view of a conventional apparatus for unreeling solar panels.
Figure 2:
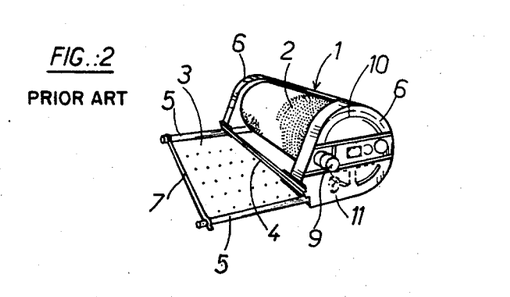
FIG. 2 is a diagrammatical view in perspective of a known construction of such an apparatus.

The known device shown in FIGS. 1 and 2 comprises a housing 1 in which is stored a suitably folded or rolled up compact mass 2 of rectangular "skin" of flexible band carrying a plurality of interconnected solar batteries. During deployment this band 3 projects from a slot 4 provided along a generatrix of the housing 1 under the action of two struts 5 adapted to unreel laterally and retained in respective housings 6, and connected at their ends by a fixed cross member 7 to the end of which is fixed the free end of the band 3 by a certain number of mountings 8. The drive is taken from an electric motor 9 through a toothed drum 10, wherein the travel of the extensible struts 5 is synchronised by a transmission shaft 11.

Since the systems for extending rectangular solar panels of this kind are known, it is unnecessary to discuss the structural details of these embodiments. Reference may be made in this respect to the above mentioned article by D.D. Abbott, particularly to the bibliographical references at the end of this article, for example, to the project of the Ryan Aeronautical Company submitted in pursuance of the contract of the Jet Propulsion Laboratory 951 107 of June 21 1968.

Figure 3:
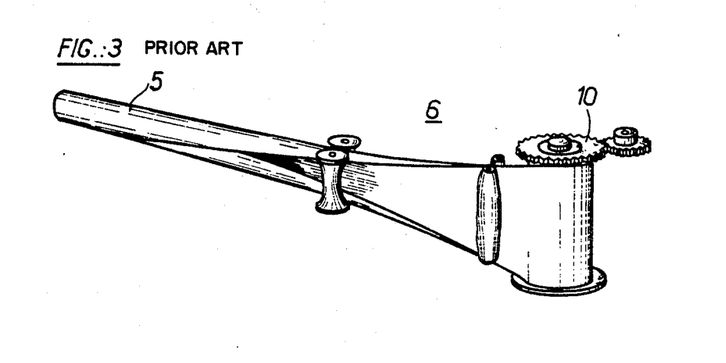
FIG. 3 is a view in perspective of an embodiment of a strut adapted to be unreeled.

Merely by way of example, and to indicate the principle, FIG. 3 shows a strut adapted to be unreeled and made by De Havilland of Canada Ltd. Unreeling struts of this kind are well known in the art under the designation "STEM" (storable tubular extendible member).

FIGS. 4a and 4b show the appearance of a satellite before and after the deployment of known rectangular solar panels 3 arranged in the shape of a cross around the body of the satellite 12.

This distribution is reproduced in dotted outline in the plan view of FIG. 5 and superimposed thereon in solid lines are four trapezoidal panels 13 in accordance with the invention and having substantially the same surface as the rectangular panels 3. it can be easily seen that the general shape of the Greek cross of the known arrangement has been replaced by a form having the general shape of a Maltese cross with a much shorter length of the arm, although the overall surface has remained the same.

The deployment of the solar panels 13 in the form of a trapezium requires various fittings of the skin and of its supporting frame, and further aspects of the invention relate to these fittings, which will be described further below.

The "skin" is stored as previously known, in the housing 1 in a compact arrangement, e.g. in the shape of a roll, having a width slightly less than the length of the slot 4, so that it can pass therethrough in the shape of a rectangular band. However, compared with hitherto known constructions, this band is not formed by a single layer and comprises sections which are folded back. The width of the outlet slot 4 of the housing 1 must, of course, make allowance for the additional thickness caused by the folded up parts of the panel.

Figures 6, 7, 11:
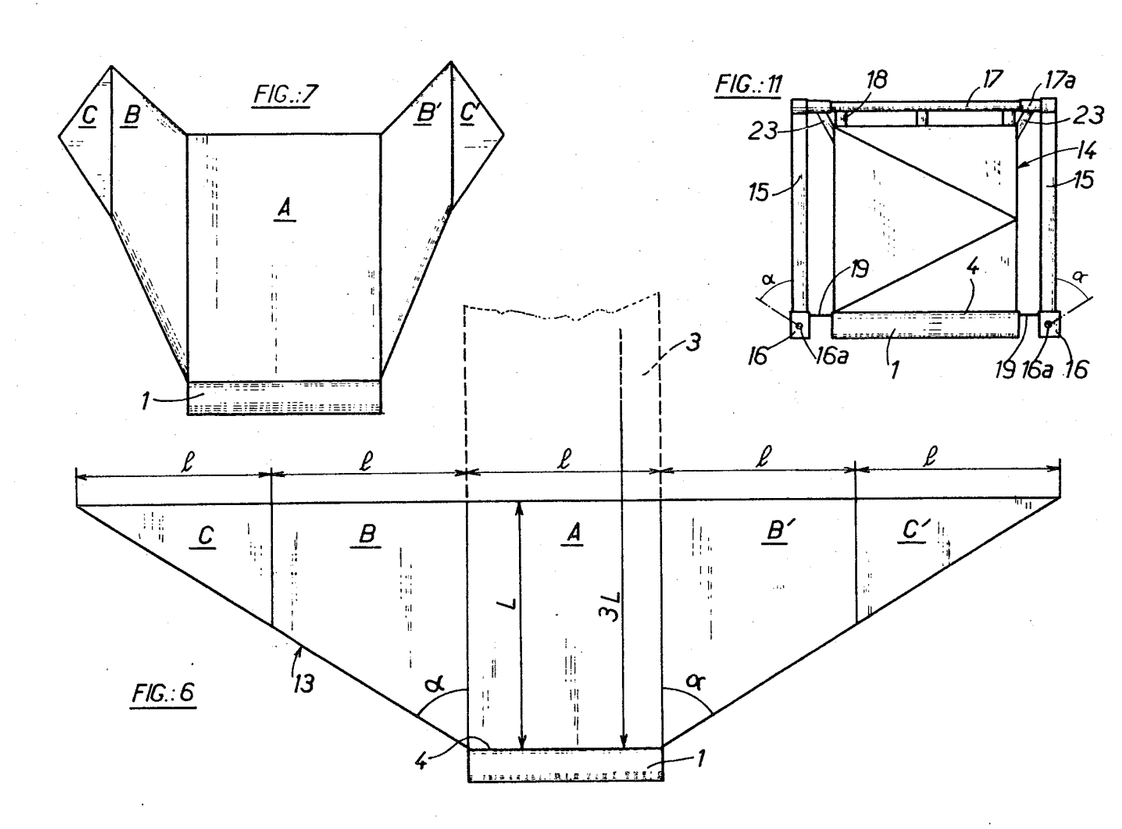

FIG. 6 shows the skin 13 in its fully deployed state. In the embodiment shown, it is divided into a rectangular centre part A having the length L and the width l, into two intermediate parts B, B', on both sides of the centre panel A, having the shape of trapezoidal rectangles with the height l and two end parts C, C' beyond the intermediate parts B, B', and having the shape of a right angled triangle with the height l. The unit has therefore the shape of an isosceles trapezium with bases having the widths l and 5l respectively, and the height L.

It may be seen that the surface of the trapezoidal panel 13 is equal to 3lL and that a rectangular panel 3 with the same width l and the same surface would have a length of 3L.

For an optimum distribution in space, an angle $\alpha$ is chosen which is preferably equal or near to 45°. In this case, the length L will be near twice the width l.

For fitting the skin into the housing 1, the intermediate parts B, B' are folded over and the outer parts C, C' are folded back along the parallel sides as shown in FIG. 7. Then, one intermediate part B is folded back on the centre part A, then the corresponding part C on the part B as shown in FIG. 8. The same operation is repeated for the other intermediate part B' and its corresponding outer part C', to produce finally the folded rectangular part 14, shown in FIG. 9, having five superimposed layers and a width equal to l.

This part 14 may then be rolled up in the housing 1 by introducing it through the slot 4 as shown in FIG. 10, and the full housing fixed to the body of the satellite.

Figures 12, 13:
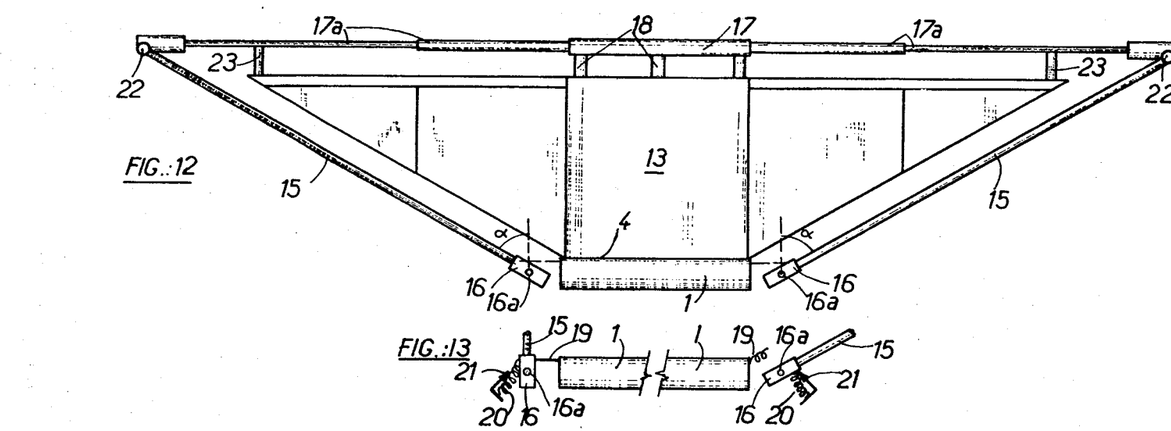
FIG. 12 shows diagrammatically this embodiment after the termination of the deployment.
FIG. 13 shows a detail of the construction in two different positions.

The solar panels are deployed in space in the reverse sequence to the folding described above : first the rectangular part 14 is unreeled from the housing 1 by extracting it through the slot 4 (FIG. 11) and is spread out to its final trapezoidal shape 13 (FIG. 12).

The first of these operations, namely the unreeling of the rectangular part 14, is carried out in the manner usually used for conventional rectangular panels, i.e., by extending struts 15 from their housings 16, and by pulling across element 17 acting on the skin by mountings 18, the second operation, namely the trapezoidal deployment makes use of the innovations to the framework.

The housing 16 for the struts 15 adapted to be unreeled are so mounted that they can pivot through an angle $\alpha$ towards the outside (this angle $\alpha$, preferably about 45°, is substantially the half angle of aperture of the trapezoidal panel 13) about a pivot 16a which is perpendicular to the plane of th panel 13. This inclination may be achieved by breading a mounting 19 (FIG. 13) and by the action of a tension spring 20, wherein the angular travel of the housing is limited to the angle $\alpha$ by an abutment 21. Dash-pots (not shown) or other dampers may preferably be provided to slow down the movement of the struts 15 after the rupture of the retaining mountings 19.

Obviously, it is possible to use other technically equivalent means for pivoting the housings 19, for example servo motors.

The outward pivoting of the struts 15 is accompanied by an extension of the cross bar 17 which is not in this case a simple rigid connection, as in the hitherto known constructions, but must be extensible in the same manner as the struts 15.

By way of example, such an extensible transverse element 17 may be formed by a telescopic radio aerials, preferably with automatic interlocking of blades 17a in the extended position, whilst the ends of the struts 15 are hinged at 22 to the ends of the terminal blades 17a. A motor acting on the cross element 17 is synchronised with the means for pivoting the housings 19 and is preferably used for the lateral deployment. As a modification, it is possible to use as element 17 a preformed spiral known under the designation "STACER" (Spiral Tube and Actuator for Controlled Extension and Retraction) manufactured by the Unter Spring Division of AMETEK Inc. It must be understood that these two examples are in no way exclusive, and other extensible frame elements may also be used, such as distending frames or pantograph-like frames.

Figure 14:
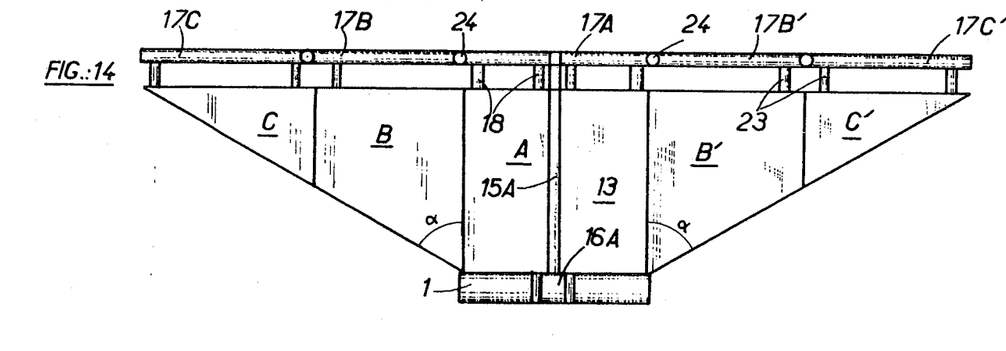
FIG. 14 is a view corresponding to FIG. 12 but showing a modification of the object of the invention.
Figures 15, 16:
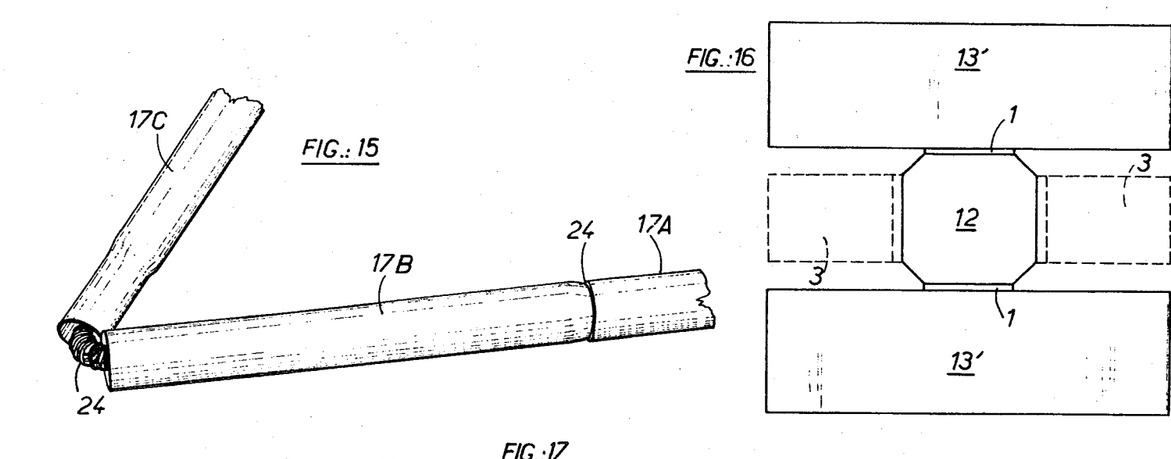
FIG. 15 is a structural detail of this modification.
FIGS. 16 and 17 are views corresponding to FIGS. 5 and 12 respectively, but showing a further embodiment of the present invention.

Moreover, it is not essential to use a cross element which extends necessarily along its own axis and, as shown in FIG. 14, an articulated element, adapted to move about hinges, or systems similar to certain tent poles may be used. One such system is illustrated in FIG. 15.

In this connection, it should be noted that whilst the solution using a telescopic device or a "STACER" permits the attachment of supplementary mountings 23 towards the points of the trapezoidal panel 13, in addition to the attachments 18 provided in the centre zone, the solution using a hinged folding element permits multiplication of these additional attachments as shown in FIG. 14. In fact, the bar may consist of as many elements 17A, 17B, 17B', 17C, 17C' as the panel 13 has folding parts A, B, B', C, C', wherein the joints 24 between successive elements of the bar are at the points of the lines along which the panel is folded. In this manner, the bar can be folded in exactly the same way as the parts of the panel and unfolded together with the same, whilst each element is permanently attached to its associated sub-panel.

In FIG. 14 the cross bar is connected with its centre element 17A to a single extensible strut 15A, which occupies with its housing 16 a centre position, and which does not pivot.

In all embodiments with trapezoidal panels the outer points of each panel may be provided with interlocking or anchoring systems whereby the four panels are locked together to form a generally square configuration.

The embodiment of FIG. 16 makes it possible to produce an active surface which is almost as large as that of the preceding embodiment (general outline of which is shown in FIG. 5) using only two panels 13' and hence two systems for symmetrical deployment relative to the body of the satellite 12.

Figure 17:
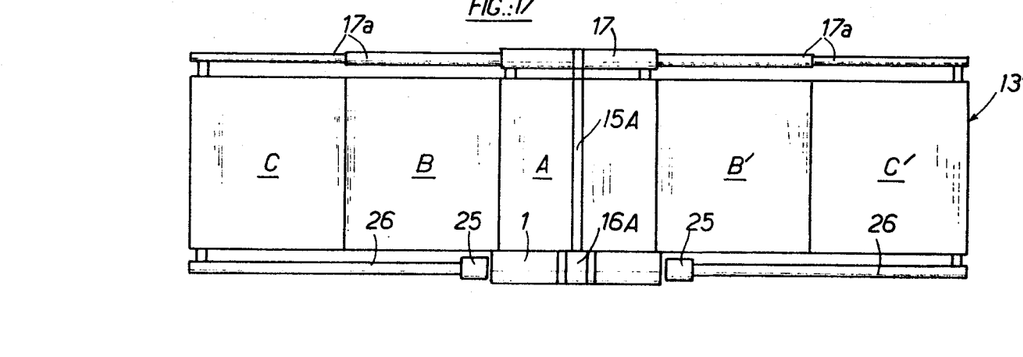

FIG. 17 shows in detail one of the two panels 13': the parts B, C, C', C' of the "skin" of the panel are fixed not only along their edge remote from the housing 1 to struts 17, 17a as above, but also along their near edges to extensible struts 26. Before the deployment they are stowed away in housings 25 similar to the housings 6 in FIG. 1, but oriented tangentially and no longer radially relative to the body of the satellite 12.

Obviously, it is always possible to improve the utilisation of space by adding on both sides of the body of the satellite 12, in the zones remaining free between the deployed panels 13' with large surfaces two conventional rectangular panels 3 as shown by dotted lines in FIG. 16.

Obviously, the embodiments above described are merely examples which can be modified by substituting technical equivalents without therefore departing from the principle of the invention. The extensible struts may be, for example, pantograph system, inflatable struts or "STACER" devices.

Moreover, the skin need not necessarily be rolled up on a reel but may be folded after the manner of an accordion in a housing of rectangular cross-section located at the same point of th satellite as the reel. Finally, instead of providing the driving force for the lateral deployment of the panels at the level of the pivoting housing 16 in the embodiment in accordance with FIGS. 11 to 13 (where the driving force is supplied by springs 20), it may be generally at the level of the extensible cross member 17, by providing at this level servo motors or other driving elements suitable for causing directly the extension of the cross member 17, and thereby the pivoting of the struts 15.

Figure 18:
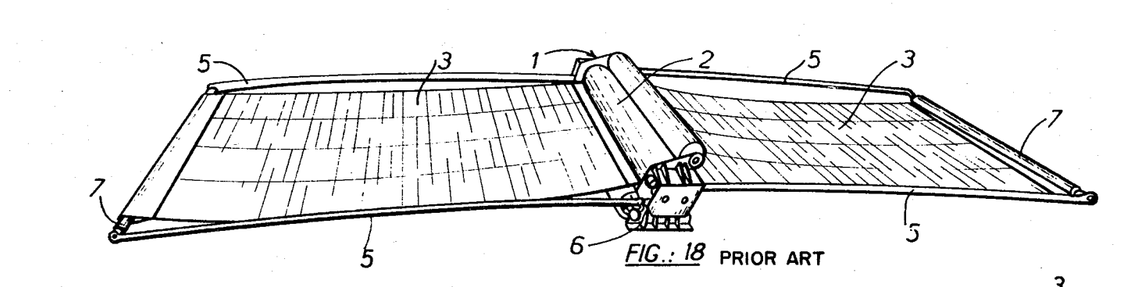
FIG. 18 shows a perspective view of a known system with two solar panels for deployment in opposite directions.

FIG. 18 relates to a system known as "FISCA" and proposed by the American firm Hughes Aircract Company. This device comprises substantially a frame 1 in which is stowed compactly a double mass 2 suitably folded or rolled up in the shape of a rectangular skin or flexible band, carrying a plurality of interconnecting solar batteries. During the deployment each band 3 located in the frame 1 extends under the action of two unreeling lateral struts 5 located in respective housing 6 and connected endwise by a fixed brace 7 to which the free end of the band 3 is fixed.

Figure 19:
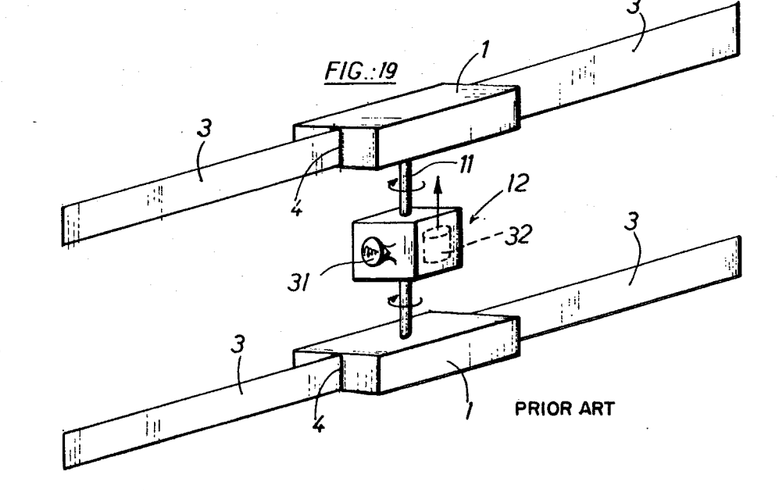
FIG. 19 shows in perspective the deployment in the known case of an unfolded system.

This system FISCA may itself be divided into two and operated in accordance with the arrangement illustrated in FIG. 19 where the body of the satellite is indicated diagrammatically at 12 and where the starting position of the band before the deployment is indicated at 4. The orientation of the panels is effected by drive shafts 11. The release of the bands 3 takes place simultaneously in two opposite directions.

Without entering into the details of such an imaginable configuration, it will simply be shown that it consists in articulating the system of panels 3 in a direction parallel to the normal orbital direction and possibly equipping the body of the satellite 12, the support of the antenna 31 with a flywheel 32.

It can easily be seen that the space surrounding the satellite is badly utilised, which necessitates excessive lengths of the panels 3 in order to produce the required electrical power.

THE INVENTION HEREIN

Figure 20:
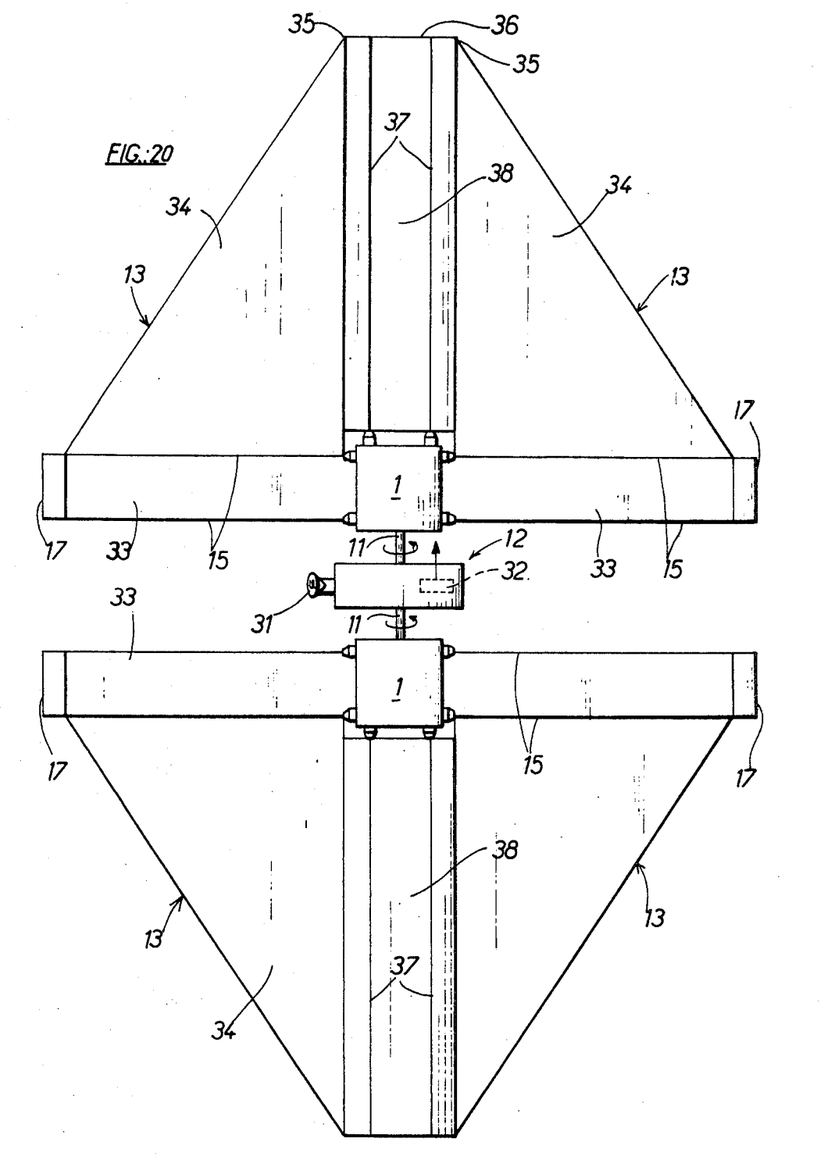
FIG. 20 is a diagrammatical plan view of an embodiment of the same type, but adapted in accordance with the present invention.

This defect may be eliminated by using the principle of the invention as illustrated in FIG. 20, where each rectangular band of each solar panel 13, having the base 33, is augmented laterally by a right angled triangle 34, which produces a much more concentrated assembly around the body 12 with the same surface.

Figure 21:
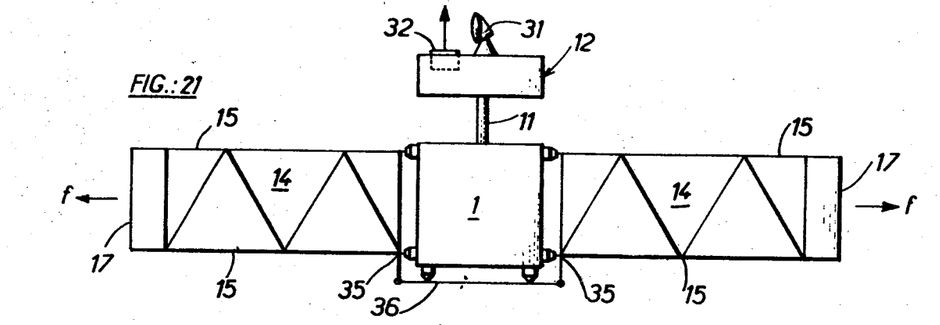
FIGS. 21, 22 and 23 are diagrams explaining the unreeling for deployment in accordance with the present invention.
Figure 22:
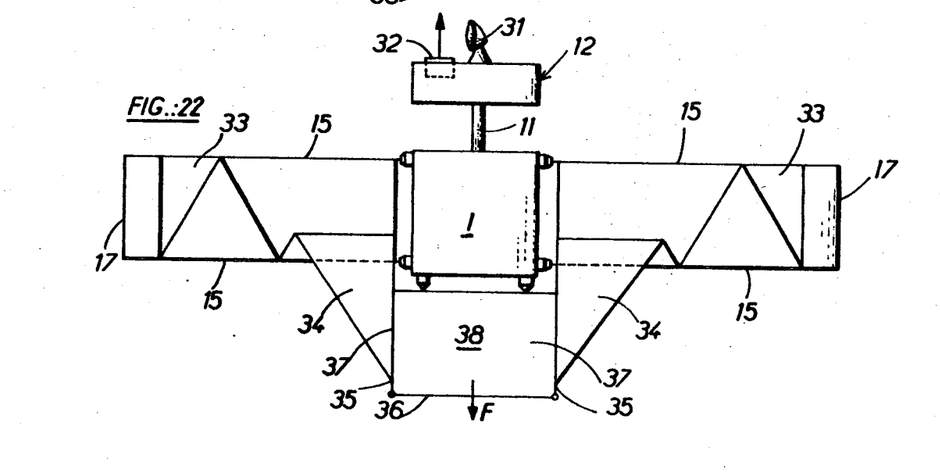
Figure 23:
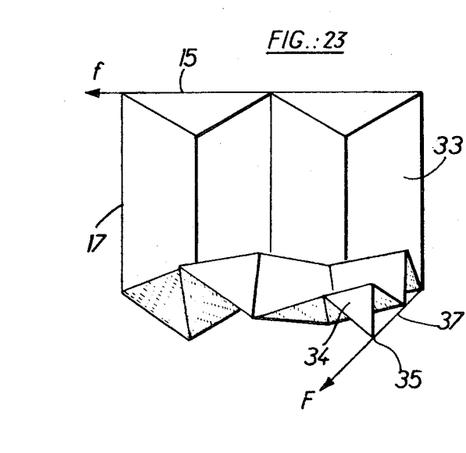

The arrangement uses a deployment of the panels in two stages as described in the following with reference to FIGS. 21, 22 and 23.

During the first stage, two parts 14, 14 are deployed which are stowed away in the surfaces of the satellite. Each of these parts is formed by a rectangular element (part 33 in FIG. 20) over which is folded another element in the shape of a right angled triangle (part 34). The deployment of each of these parts 14 is effected by means of two struts 15, 15 adapted to open out laterally (or by way of modification, a single centre strut) carrying along a transverse end bar 17 positioned generally perpendicularly to the direction of deployment *f*.

The characteristic feature of this arrangement consists in connecting the point 35 of each rectangular element 34 nearest to the satellite to a cross bar 36 attached to struts 37 adapted to expand, and ensuring the deployment of a third panel 38 in a direction F which is perpendicular to the preceding directions *f—f* of the deployment. During the whole third stage of the deployment (FIG. 21) this point 35 does not change its geometrical position.

Then follows during the second stage (FIG. 22) the deployment of the third panel 38 which carries along the two points 35, 35 of the triangular parts 34, 34 which have remained adjacent to the satellite, whereby these two triangular elements are spread out in the direction F at right angles to the direction *f* of the first stage of deployment.

The deployment of a continuous surface presenting a high degree of occupation around the satellite 12, is thus realised as indicated in FIG. 20, where the chosen configuration of the satellite makes it possible to divide the arrangement. It will be noted that, where these surfaces have a generally trapezoidal shape, the large base is near the body of the satellite 12, contrary to the trapezoidal configuration described with reference to FIGS. 5 to 14.

I claim:

1. A space station having a compact body with reduced-size stowing facility aboard said body, comprising:
   — a continuous sheet of flaccid material carrying a solar cell array and tailored to stretch out into a generally triangular shape having an overall base length and altitude largely in excess of the size of said stowing facility, said sheet being stowed in said facility as a package obtained by first folding said sheet from its triangular stretched out configuration so that it assumes a multi-layer rectangular strip shape having a width not greater than that of said stowing facility, and then by winding said rectangular strip into a generally cylindrical package fitted in said facility, and
   — a sheet stretcher system comprising relatively rigid extendible struts triggerable from a retracted position and pilotingly associated with said sheet to deploy the same from said package condition thereof, said struts being retractable into said body and projectable therefrom in diverging directions at a substantial angle therebetween to define two sides of said sheet of generally triangular shape, the vertex of which is adjacent said body and said struts being substantially fast against pivotal displacement relative to said body.

2. Space station as claimed in claim 1, wherein said continuous sheet is in the general shape of a right-angled triangle having its rectangular vertex adjacent said body and its two substantially perpendicular sides radiating therefrom.

3. Space station as claimed in claim 1, wherein the third side of said sheet of generally triangular shape, which is remote from said body, is free, not being tied to any strut extending therealong.

4. Space station as claimed in claim 1, comprising two like continuous sheets of triangular shape stowed on opposite sides of said body, and respective sheet stretcher systems having homolog extendible struts projectable from said body in opposite directions, and further homolog extendible struts projectable from said body in a same direction at a substantial angle with respect to the above opposite directions, whereby said sheets when stretched out have together a generally trapezoidal shape, the major base of which is adjacent said body.

* * * * *